United States Patent
Wu et al.

(10) Patent No.: US 9,356,733 B2
(45) Date of Patent: May 31, 2016

(54) METHOD AND APPARATUS FOR SOFT OUTPUT FIXED COMPLEXITY SPHERE DECODING DETECTION

(71) Applicant: ZTE Microelectronics Technology Co., Ltd, Shenzhen (CN)

(72) Inventors: Gang Wu, Shenzhen (CN); Wenshui Shen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/648,089

(22) PCT Filed: Sep. 23, 2013

(86) PCT No.: PCT/CN2013/084017
§ 371 (c)(1),
(2) Date: Jul. 7, 2015

(87) PCT Pub. No.: WO2014/082487
PCT Pub. Date: Jun. 5, 2014

(65) Prior Publication Data
US 2015/0304069 A1     Oct. 22, 2015

(30) Foreign Application Priority Data
Nov. 29, 2012   (CN) .......................... 2012 1 0499242

(51) Int. Cl.
*H04L 27/06*     (2006.01)
*H04L 1/00*      (2006.01)
(Continued)

(52) U.S. Cl.
CPC ............ *H04L 1/0054* (2013.01); *H04B 7/0456* (2013.01); *H04L 25/03242* (2013.01); *H04L 25/03318* (2013.01)

(58) Field of Classification Search
CPC ............. H04L 1/0054; H04L 25/0204; H04L 25/0206; H04L 25/0246; H04L 25/03203; H04L 25/03318; H04L 25/03242; H04L 25/03891; H04L 25/067; H04B 7/0413; H04B 7/0452; H04B 7/0456
See application file for complete search history.

(56) References Cited

U.S. PATENT DOCUMENTS

| | | | |
|---|---|---|---|
| 2010/0014606 A1 | 1/2010 | Chen | |
| 2010/0086067 A1* | 4/2010 | Oka | ...................... H04B 7/0413 375/260 |
| 2012/0269303 A1* | 10/2012 | Paker | ................ H04L 25/03242 375/341 |

FOREIGN PATENT DOCUMENTS

| CN | 101373975 A | 2/2009 |
|---|---|---|
| CN | 101557269 A | 10/2009 |

(Continued)

OTHER PUBLICATIONS

International Search Report in international application No. PCT/CN2013/084017, mailed on Dec. 12, 2013.
(Continued)

*Primary Examiner* — David B. Lugo
(74) *Attorney, Agent, or Firm* — Oppedahl Patent Law Firm LLC

(57) ABSTRACT

Provided are an SFSD detection method and apparatus, and the method includes: QR decomposition is performed on a channel response matrix to acquire a Q matrix and an R matrix; the conjugate transpose of the Q matrix is multiplied by a received signal to acquire an equalized signal of the received signal; ML path detection is performed on the equalized signal, reserved nodes in respective layers are decreased layer by layer to acquire an ML path, and branches as many as iterations are reserved; ML complementary set path detection is performed on the branches, and all nodes of an acquired complementary set layer are reserved and reserved nodes in other layers are decreased layer by layer to acquire an ML complementary set path; and LLR information of each bit of each symbol of each layer is acquired according to the ML path and the ML complementary set path. For more-than-two-layer MIMO, the disclosure can acquire a detection performance approaching the ML performance and meet requirements on acceptable hardware implementation complexity.

4 Claims, 4 Drawing Sheets

(51) Int. Cl.
*H04L 25/03* (2006.01)
*H04B 7/04* (2006.01)

(56) References Cited

FOREIGN PATENT DOCUMENTS

CN 101582750 A 11/2009
WO 2010000075 A1 1/2010

OTHER PUBLICATIONS

English Translation of the Written Opinion of the International Search Authority in international application No. PCT/CN2013/084017, mailed on Dec. 12, 2013.

A low-complexity soft mimo detector based on the fixed-complexity sphere decoder, Apr. 2006.
Fixing the complexity of the sphere decoder for MIMO detection, Jun. 2008.
Soft-Output Sphere Decoding: Algorithms and VLSI Implementation, Feb. 2008.
Supplementary European Search Report in European application number: 13858769.6, mailed on Nov. 6, 2015.
A Low Complexity Soft-Output QRD-M Algorithm for MIMO-OFDM Systems, mailed on Sep. 23, 2010.

\* cited by examiner

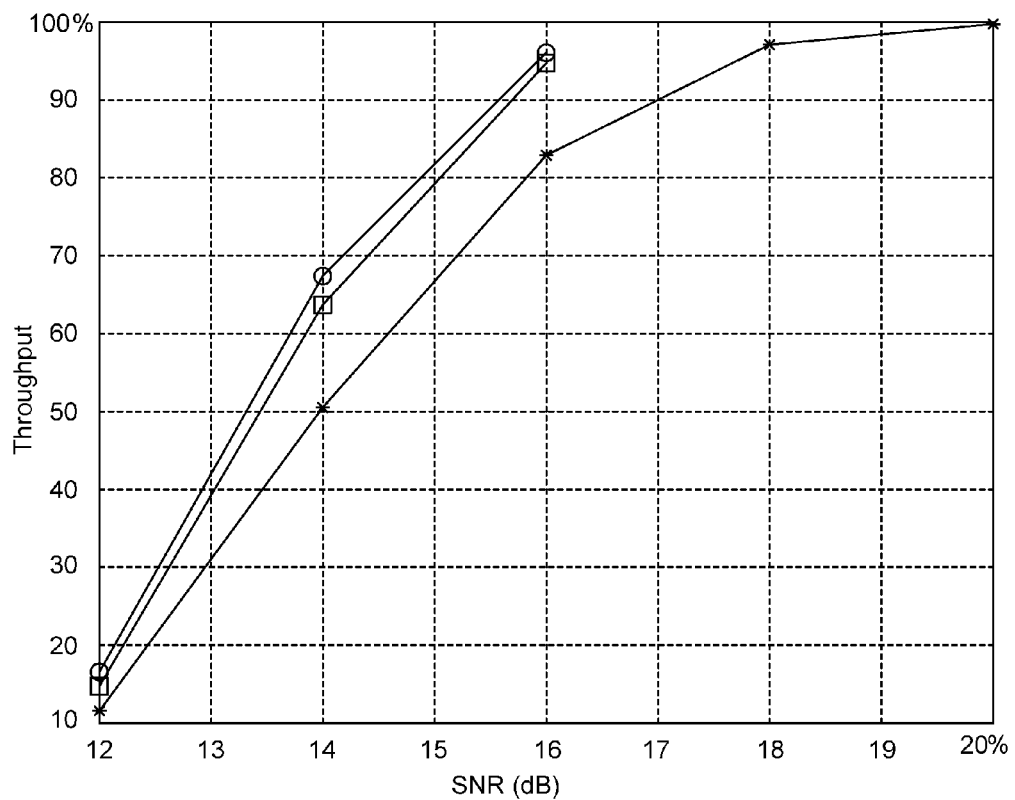

METHOD AND APPARATUS FOR SOFT OUTPUT FIXED COMPLEXITY SPHERE DECODING DETECTION

TECHNICAL FIELD

The present disclosure relates to Multiple-Input Multiple-Output (MIMO) detection techniques in wireless communications, and in particular to a method and apparatus for Soft-output Fixed-complexity Sphere Decoding (SFSD) detection.

BACKGROUND

In a 3rd Generation Partnership Project (3GPP) Long Term Evolution Advanced (LTE-A) system, multiple layer MIMO transmission is adopted to achieve high spectral efficiency, and corresponding receivers are required to detect multiple layer MIMO to obtain demodulated data.

There are many MIMO detection methods. Sphere Decoding (SD) detection can approach the optimal performance, i.e., Maximum Likelihood performance, thus in order to obtain the optimal performance, the SD detection is used to implement MIMO detection in cases of acceptable hardware implementation complexity. The SD detection includes Fixed-complexity Sphere Decoding (FSD) and non fixed-complexity sphere decoding, and the FSD is commonly used since it is readily to be implemented by Very Large Scale Integration (VLSI). In addition, soft-output MIMO detection can be adapted to subsequent soft decoders to enable the system to achieve better detection performance, thus SFSD detection is commonly used at present.

Generally, processes for receivers in an LTE-A system to perform SFSD detection mainly include preprocessing, sphere detection and Likelihood Ratio (LLR) output, wherein the preprocessing includes generation of an equivalent channel matrix, sequencing and QR decomposition.

Due to high requirements on spectral efficiency of a system based on International Mobile Telecommunications-Advanced (IMT-Advanced) specifications established by the International Telecommunications Union (ITU), an LTE-A system is required to achieve a downlink spectral efficiency of 30 bps/Hz and an uplink spectral efficiency of 15 bps/Hz. In order to meet these requirements, an LTE-A system adopts 8-layer MIMO at most on downlink and 4-layer MIMO at most on uplink, and it also supports modulation modes such as Quadrature Phase Shift Keying (QPSK)/16 Quadrature Amplitude Modulation (QAM)/64QAM. Due to a great increase in MIMO layers, a very large amount of computation is resulted in sphere detection.

An article (prior art 1) entitled "A low-complexity soft MIMO detector based on the fixed-complexity sphere decoder" (by L. G. Barbero, T. Ratnarajah, and C. Cowan, published on IEEE International Conference on acoustics, speech and signal processing (ICASSP'08), Las Vegas, USA, March/April 2006) and an article (prior art 2) entitled "Fixing the complexity of the sphere decoder for MIMO detection" (by L. G. Barbero and J. Thompson, published on IEEE Transaction. on Wireless Communications, vol. 7, no. 6, June 2008) proposed a method for reducing complexity of SFSD detection, in which an ML complementary set path is structured using bit-negating, i.e., only a measurement of a path of which each bit is negated in sequence among ML paths is calculated (for example, for 64QAM, each symbol has 6 bits, thus there are only 6 possible complementary set paths), in this way, though the complexity is reduced, too much information is lost when only a bit-negated path is calculated, thus the detection performance cannot reach the optimal ML performance.

An article (prior art 3) entitled "Soft-Output Sphere Decoding: Algorithms and VLSI Implementation" (by Studer, C.; Burg, A.; Bolcskei, H., published on IEEE Journal on Selected Areas in Communications, vol. 26, no. 2, February 2008) proposed a non fixed-complexity sphere encoding method unlike the fixed-complexity encoding in which a fixed node is reserved in each layer and detection will be carried out at a next layer after all possible nodes of a previous layer have been detected, instead, one node of a next layer will be detected after one node of a previous layer has been detected until a bottom layer is reached, then path backtracking is performed according to detection radii and certain criteria until an optimal path is obtained. The optimal ML performance can be achieved in this way, but the complexity is not fixed, and it will be hard to implement the method when a channel is changed to a certain condition where the complexity is extremely high.

SUMMARY

In view of the above, embodiments of the disclosure are intended to provide a method and apparatus for SFSD detection, which can acquire a detection performance approaching the ML performance for more-than-two-layer MIMO and meet requirements on acceptable hardware implementation complexity.

To this end, the technical solutions of embodiments of the disclosure are implemented as follows.

An embodiment of the disclosure provides a method for SFSD detection, including:

QR decomposition is performed on a channel response matrix to acquire a Q matrix and an R matrix;

a conjugate transpose of the Q matrix is multiplied by a received signal to acquire an equalized signal of the received signal;

Maximum Likelihood (ML) path detection is performed on the equalized signal, reserved nodes in respective layers are decreased layer by layer to acquire an ML path, and branches as many as iterations are reserved;

ML complementary set path detection is performed on the branches, and all nodes of an acquired complementary set layer are reserved and reserved nodes in other layers are decreased layer by layer to acquire an ML complementary set path; and Likelihood Ratio (LLR) information of each bit of each symbol of each layer is acquired according to the ML path and the ML complementary set path.

In an embodiment, the step that ML path detection is performed on the equalized signal, reserved nodes in respective layers are decreased layer by layer to acquire an ML path, and branches as many as iterations are reserved may include:

path extension is performed starting from a top layer of the R matrix, which is a layer having only one non-zero element, to a bottom layer;

all nodes of the top layer are reserved, and reserved nodes in layers below the top layer are decreased layer by layer to acquire Euclidean distances of respective branches; and a branch having a minimum Euclidean distance is selected as the ML path, and branches as many as iterations are reserved.

In an embodiment, the step that ML complementary set path detection is performed on the branches, and all nodes of an acquired complementary set layer are reserved and reserved nodes in other layers are decreased, layer by layer, to acquire an ML complementary set path may include:

path extension is performed starting from acquired complementary set layers of respective reserved branches to corresponding bottom layers;

all nodes of the acquired complementary set layers are reserved and reserved nodes in layers below the acquired complementary set layers are decreased layer by layer to acquire Euclidean distances of respective branches; and a branch having a minimum Euclidean distance is selected layer by layer starting from the acquired complementary set layers, as an ML complementary set path of each layer.

In an embodiment, the step that reserved nodes in layers below the acquired complementary set layer are decreased layer by layer until the bottom layer has one node may include:

reserved nodes in layers below the acquired complementary set layer are decreased layer by layer until the bottom layer has one node.

An embodiment of the disclosure provides an apparatus for SFSD detection applied to a receiver, and the apparatus includes:

a QR decomposition unit configured to perform QR decomposition on a channel response matrix to acquire a Q matrix and an R matrix;

an equalized signal calculation unit configured to multiply a conjugate transpose of the Q matrix by a received signal to acquire an equalized signal of the received signal;

an ML path detection unit configured to perform Maximum Likelihood (ML) path detection on the equalized signal, to decrease, layer by layer, reserved nodes in respective layers to acquire an ML path, and to reserve branches as many as iterations;

an ML complementary set path detection unit configured to perform ML complementary set path detection on the branches, and to reserve all nodes of an acquired complementary set layer and to decrease, layer by layer, reserved nodes in other layers to acquire an ML complementary set path; and a soft value information calculation unit configured to acquire Likelihood Ratio (LLR) information of each bit of each symbol of each layer according to the ML path and the ML complementary set path.

In an embodiment, the ML path detection unit may be specifically configured to:

perform path extension starting from a top layer of the R matrix, which is a layer having only one non-zero element, to a bottom layer;

reserve all nodes of the top layer and to decrease, layer by layer, reserved nodes in layers below the top layer to acquire Euclidean distances of respective branches; and select a branch having a minimum Euclidean distance as the ML path, and to reserve branches as many as iterations.

In an embodiment, the ML complementary set path detection unit may be specifically configured to:

perform path extension starting from acquired complementary set layers of respective reserved branches to corresponding bottom layers;

reserve all nodes of the acquired complementary set layers, and decrease, layer by layer, reserved nodes in layers below the acquired complementary set layers to acquire Euclidean distances of respective branches; and select, layer by layer, starting from the acquired complementary set layers, a branch having a minimum Euclidean distance as an ML complementary set path of each layer.

In an embodiment, the ML complementary set path detection unit may be specifically configured to reserve all nodes of the acquired complementary set layers and to decrease, layer by layer, reserved nodes in layers below the acquired complementary set layers until the bottom layers have one node, so as to acquire Euclidean distances of respective branches.

It can be seen from above that the technical solution according to the embodiments of the disclosure includes: QR decomposition is performed on a channel response matrix to acquire a Q matrix and an R matrix; the conjugate transpose of the Q matrix is multiplied by a received signal to acquire an equalized signal of the received signal; ML path detection is performed on the equalized signal, reserved nodes in respective layers are decreased layer by layer to acquire an ML path, and branches as many as iterations are reserved; ML complementary set path detection is performed on the branches, and all nodes of an acquired complementary set layer are reserved, and reserved nodes in other layers are decreased layer by layer to acquire an ML complementary set path; and LLR information of each bit of each symbol of each layer is acquired according to the ML path and the ML complementary set path; in this way, a detection performance approaching the ML performance can be acquired for more-than-two-layer MIMO, and requirements on acceptable hardware implementation complexity are met.

BRIEF DESCRIPTION OF THE DRAWINGS

FIG. 7 is a comparison diagram of throughput simulation results between prior arts 1, 2, 3 and 16QAM according to an embodiment of the disclosure.

DETAILED DESCRIPTION

Figure 1:
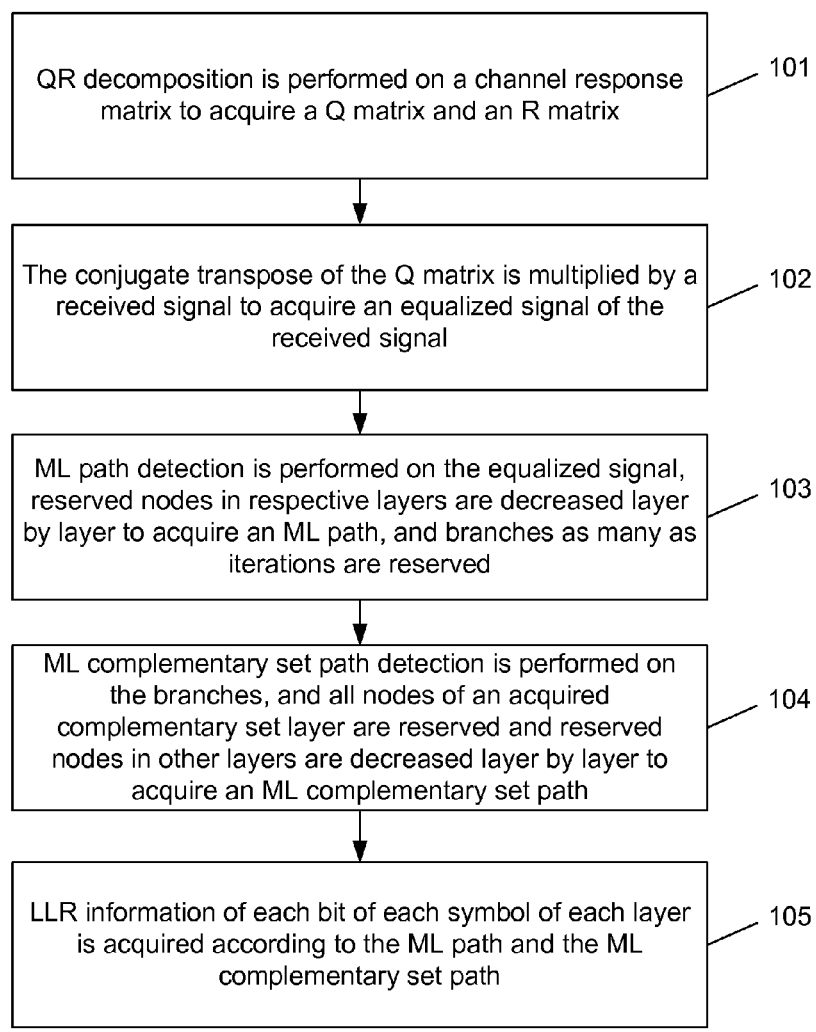
FIG. 1 is a flow chart of an SFSD detection method according to a first embodiment of the disclosure.

A first embodiment of an SFSD detection method provided by the disclosure is as shown in FIG. 1, and the method includes the following steps:

step 101, QR decomposition is performed on a channel response matrix to acquire a Q matrix and an R matrix;

step 102, the conjugate transpose of the Q matrix is multiplied by a received signal to acquire an equalized signal of the received signal;

step 103, ML path detection is performed on the equalized signal, reserved nodes in respective layers are decreased layer by layer to acquire an ML path, and branches as many as iterations are reserved;

step 104, ML complementary set path detection is performed on the branches, and all nodes of an acquired complementary set layer are reserved and reserved nodes in other layers are decreased layer by layer to acquire an ML complementary set path; and step 105, LLR information of each bit of each symbol of each layer is acquired according to the ML path and the ML complementary set path.

Preferably, the step that ML path detection is performed on the equalized signal, reserved nodes in respective layers are decreased, layer by layer, to acquire an ML path, and branches as many as iterations are reserved may include:

path extension is performed starting from a top layer of the R matrix, i.e., a layer having only one non-zero element, to a bottom layer;

all nodes of the top layer are reserved and reserved nodes in layers below the top layer are decreased, layer by layer, to acquire Euclidean distances of respective branches; and a branch having a minimum Euclidean distance is selected as the ML path, and branches as many as iterations are reserved.

Preferably, the step that ML complementary set path detection is performed on the branches, and all nodes of an acquired complementary set layer are reserved and reserved nodes in other layers are decreased, layer by layer, to acquire an ML complementary set path may include:

path extension is performed starting from acquired complementary set layers of respective reserved branches to corresponding bottom layers;

all nodes of the acquired complementary set layers are reserved and reserved nodes in layers below the acquired complementary set layers are decreased, layer by layer, to acquire Euclidean distances of respective branches; and a branch having a minimum Euclidean distance is selected layer by layer starting from the acquired complementary set layers, as an ML complementary set path of each layer.

Preferably, the step that reserved nodes in layers below the acquired complementary set layer are decreased layer by layer until the bottom layer has one node may include: reserved nodes in layers below the acquired complementary set layer are decreased layer by layer until the bottom layer has one node.

Figure 2:
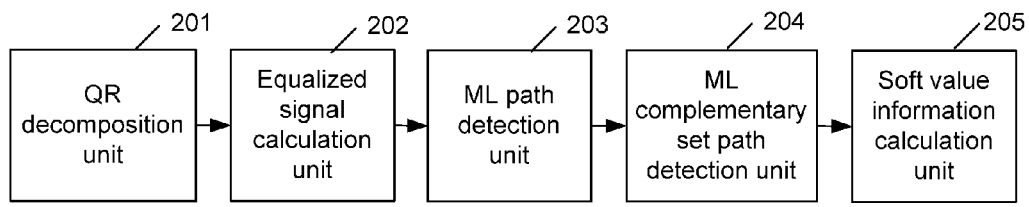
FIG. 2 is a schematic structural diagram of an SFSD detection apparatus according to an embodiment of the disclosure.

An embodiment of an SFSD detection apparatus provided by the disclosure is as shown in FIG. 2, and the apparatus includes:

a QR decomposition unit 201 configured to perform QR decomposition on a channel response matrix to acquire a Q matrix and an R matrix;

an equalized signal calculation unit 202 configured to multiply the conjugate transpose of the Q matrix by a received signal to acquire an equalized signal of the received signal;

an ML path detection unit 203 configured to perform Maximum Likelihood (ML) path detection on the equalized signal, to decrease, layer by layer, reserved nodes in respective layers to acquire an ML path, and to reserve branches as many as iterations;

an ML complementary set path detection unit 204 configured to perform ML complementary set path detection on the branches, and to reserve all nodes of an acquired complementary set layer and to decrease, layer by layer, reserved nodes in other layers to acquire an ML complementary set path; and a soft value information calculation unit 205 configured to acquire Likelihood Ratio (LLR) information of each bit of each symbol of each layer according to the ML path and the ML complementary set path.

Preferably, the ML path detection unit 203 may be specifically configured to:

extend path from a top layer of the R matrix, i.e., a layer having only one non-zero element, to a bottom layer;

reserve all nodes of the top layer and decrease, layer by layer, reserved nodes in layers below the top layer to acquire Euclidean distances of respective branches; and select a branch having a minimum Euclidean distance as the ML path, and reserve branches as many as iterations.

Preferably, the ML complementary set path detection unit 204 may be specifically configured to:

perform path extension from acquired complementary set layers of respective reserved branches to corresponding bottom layers;

reserve all nodes of the acquired complementary set layers and decrease, layer by layer, reserved nodes in layers below the acquired complementary set layers to acquire Euclidean distances of respective branches; and select, layer by layer, starting from the acquired complementary set layers, a branch having a minimum Euclidean distance as an ML complementary set path of each layer.

Preferably, the ML complementary set path detection unit 204 may be specifically configured to reserve all nodes of the acquired complementary set layers and to decrease, layer by layer, reserved nodes in layers below the acquired complementary set layers until the corresponding bottom layers have one node, so as to acquire Euclidean distances of respective branches.

In practical applications, the QR decomposition unit 201, the equalized signal calculation unit 202, the ML path detection unit 203, the ML complementary set path detection unit 204, and the soft value information calculation unit 205 can be implemented by a Central Processing Unit (CPU), a Digital Signal Processor (DSP) or a Field Programmable Gate Array (FPGA).

The SFSD detection apparatus in the embodiment can be applied to a receiver. A second embodiment of the SFSD detection method provided by the disclosure will be described below. In the embodiment, it is assumed that a MIMO system with encoding has $M_T$ transmission antennas and $M_R \geq M_T$ reception antennas, and its encoded bit stream is mapped to a constellation diagram and forms $M_T$ transmission symbols $s \in o^{M_T}$ with o being a set of constellation points. Then a received signal of UE can be represented by $y = H*s + n$ with H representing a channel response matrix $M_R*M_T$ and n being noise.

Step 301 is that sequencing and QR decomposition is performed on a channel response matrix H to acquire a Q matrix and an R matrix;

here, the Q matrix is an orthogonal matrix, and the R matrix is an upper triangular matrix.

Step 302 is that the conjugate transpose $Q^H$ of the Q matrix is multiplied by a received signal y to acquire an equalized signal of the received signal.

Figure 3:
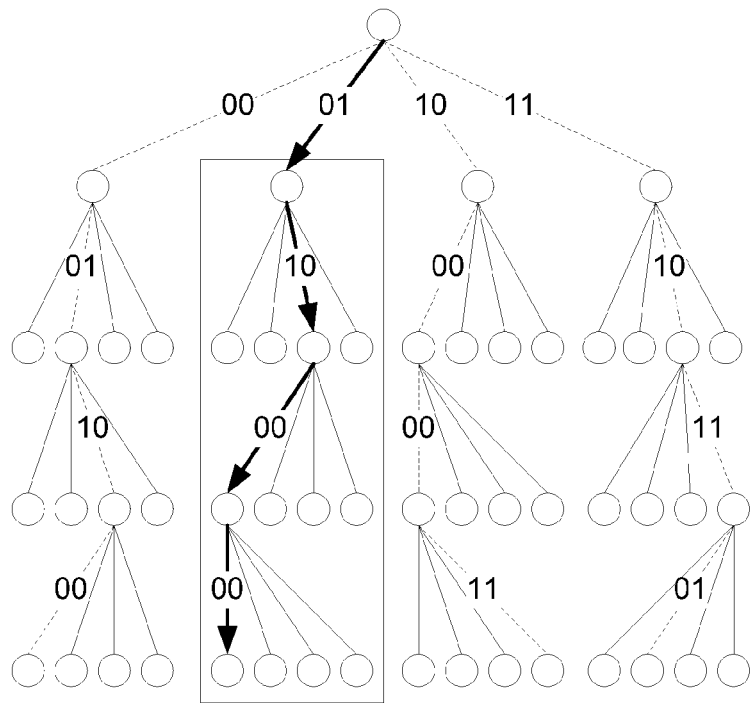
FIG. 3 is a tree diagram showing ML path detection.

Step 303 is that detection is performed starting from a top layer, i.e., a layer having only one non-zero element of the R matrix;

here, as shown in FIG. 3, the top layer is a layer beneath a top root node.

Step 304 is that it is determined whether the number of branches of the root node is larger than a preset value, e.g., the number of constellation points; if it is smaller than the preset value, proceed to step 305; if it is larger than the preset value, proceed to step 308;

step 305 is that an Euclidean distance of the top layer is calculated for each branch;

step 306 is that path extension is performed downwards from the top layer, Euclidean distances of respective layers are continued to be calculated;

an optimal node of each layer and corresponding Euclidean distance are reserved based on the preset value, and the corresponding Euclidean distance is added to an Euclidean distance of the corresponding branch.

Step 307 is that it is determined whether a leaf node is reached; if the leaf node is reached, proceed to step 308; otherwise, return to step 306;

here, as shown in FIG. 3, the leaf node is a bottom layer node.

Step 308 is that an Euclidean distance of a complete path acquired from a downward branch of a top layer root node and sequence numbers of constellation points corresponding to symbols of respective layers are stored temporarily; return to step 304 to start processing of a next branch.

Step 309 is that complete Euclidean distances of all branches are sequenced in an ascending order, a branch having a minimum Euclidean distance is selected as an ML path, and sequence numbers of constellation points corresponding to symbols of respective layers of branches are selected; sequence numbers of constellation points of respective layers of multiple optimal paths are reserved simultaneously, wherein the number of the optimal paths is as same as the number of iterations for subsequent iteration of ML complementary set paths.

Step 310 is that a complementary set $\lambda^{ML}$ of each bit of each symbol in a top layer of the ML path is acquired according to the Euclidean distances of respective branches reserved in the ML path detection and the sequence numbers of constellation points of respective layers;

here, a complete complementary set of each bit of each symbol of each layer is acquired by taking into consideration all possible cases from a top layer to a bottom layer.

Step 311 is that for complementary sets of respective layers below the top layer, for example the complementary set of the iRx-th layer, multiple iterations are required and paths on which iterations in each layer are based are in an ascending order of Euclidean distances; in an iteration, Euclidean distances from respective layers above the iRx-th layer to the iRx-th layer is calculated firstly;

here, each bit of each symbol in the layer is then traversed.

Step 312 is that Euclidean distances of respective layers below the iRx-th layer are then calculated with reference to step 306, and then path extension and node acceptance/rejection is performed downwards from the iRx-th layer.

Step 313 is that it is determined whether a leaf node is reached; if the leaf node is reached, proceed to step 314; otherwise, return to step 312.

Step 314 is that the sum of results of step 311 and 312 is calculated, and a minimum value of complete complementary sets of respective bits of respective symbols in the iRx-th layer is selected as an optimal path of the iteration and then stored temporarily.

Step 315 is that it is determined whether the number of iterations reaches a preset value; if the preset value is not reached, proceed to step 316; otherwise, proceed to step 317.

Step 316 is that the number of iterations is incremented by 1 and a next iteration is performed.

Step 317 is that for a layer where a complementary set is required to be calculated, optimal paths stored temporarily in multiple iterations can be acquired, and a minimum value is selected from these paths as a final complementary set path of the bit of the symbol of the layer.

Step 318 is that it is determined whether calculation of a complementary set has been performed on all layers; if not, proceed to step 319; otherwise, proceed to step 320.

Step 319 is that the number of layers is reduced by 1; a next layer is entered, certain steps are repeated to calculate complementary sets $\lambda_{i,k}^{\overline{ML}}$ of respective bits of respective symbols of respective layers; and step 320 is that LLR information of respective bits of respective symbols of respective layers is calculated according to formula (2) from $\lambda^{ML}$ acquired from the ML path detection and $\lambda_{i,k}^{\overline{ML}}$ acquired from the ML complementary set path detection:

$$LLR_{i,k} = \begin{cases} \frac{1}{N_0}(\lambda^{ML} - \lambda_{i,k}^{\overline{ML}}), & \text{if } x_{i,k}^{ML} = 0 \\ \frac{1}{N_0}(\lambda_{i,k}^{\overline{ML}} - \lambda^{ML}), & \text{if } x_{i,k}^{ML} = 1 \end{cases} \quad (2)$$

wherein $x_{i,k}$ represents a value at the kth bit of the ith symbol, and $N_0$ represents noise.

The method of ML path detection will be illustrated below.

Figure 4:
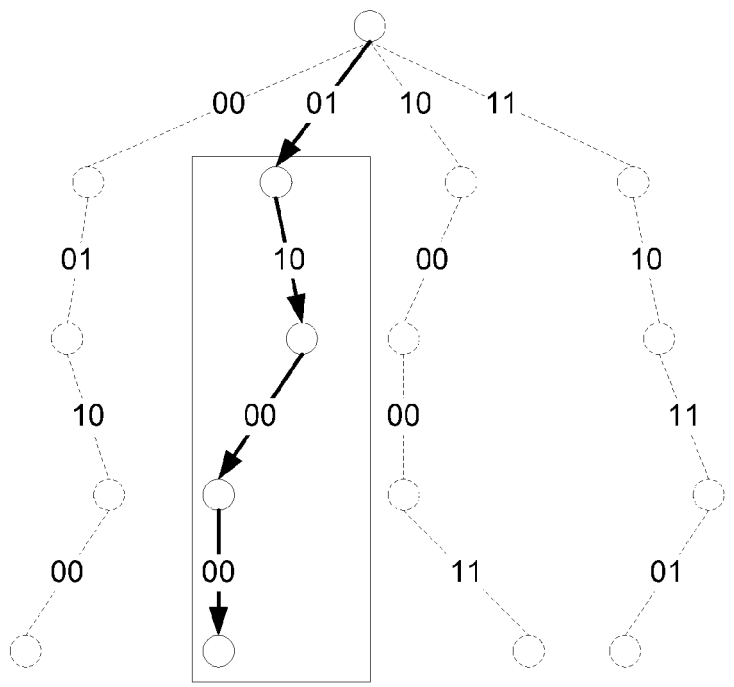
FIG. 4 is a tree diagram showing ML path detection.

After the QR decomposition of the channel matrix H is finished, evaluation of an Euclidean distance of a path can be regarded as detection and acceptance/rejection of the nodes in the tree as shown in FIG. 4. As to the ML detection, below each parent node there are as many child nodes as the number of constellation points, this applies to both root nodes and leaf nodes; as to the SFSD detection, during ML path detection, a node tree is accepted/rejected by reserving a group of nodes in each layer, and for each parent node, only those child nodes having optimal Euclidean distances are reserved, and path extension is performed from top to bottom based on the group of parameters, and an optimal path is selected finally from several complete paths reserved as the ML path. FIG. 3 and FIG. 4 show a case of 4*4 MIMO and QPSK, FIG. 3 shows that number of nodes reserved in respective layers $n_s=(n_4, n_3, n_2, n_1)^T$ ($n_i$ represents the number of child nodes reserved below a parent node) are (4, 1, 1, 1), and it can be seen from FIG. 3 that the number of finally surviving complete paths is $N_s=\Pi_{i=1}^{4} n_i=4$, i.e., the dotted line paths and the arrow line path shown in FIG. 3. An optimal path of the four paths, the arrow line path in FIG. 4, is namely the ML path.

The embodiment of the disclosure adopts a unified architecture where the number of reserved nodes is decreased layer by layer. The largest branch measurement supported when the highest modulation mode is configured for each layer under most layers is taken as a threshold, and other various modulation modes and combinations of layers are configured under such a branch measurement. Since a previously detected layer has an error propagation effect on a currently detected layer (from a top layer to a bottom layer of the tree), the number of reserved nodes in the top layer is equal to the number of constellation points (for example, for QPSK it is 4, for 16QAM it is 16 and for 64QAM it is 64), intermediate layers have a gradually-decreased number of reserved nodes, and the last few layers can all have 1 node. Different modulation modes and different numbers of layers all follow such a rule. For example, in the embodiment of the disclosure, a case that there are at most 4 layers is considered, when each layer is configured with a maximum modulation mode of 64QAM, the reserved nodes are configured to support measurement of a total of 128 branches (64 2 1 1), and detected branches of other various modulated layers are all below 128, the parameters adopted currently are as shown in table 1.

TABLE 1

|  | Reserved node $n_s = (n_1, n_2, n_3, n_4)^T$ | Number of branches |
| --- | --- | --- |
| 64 QAM, 4 layers | (64 2 1 1) | 128 |
| 64 QAM, 3 layers | (64 2 1) | 128 |
| 64 QAM, 2 layers | (64 1) | 64 |
| 16 QAM, 4 layers | (16 2 1 1) | 32 |
| 16 QAM, 3 layers | (16 2 1) | 32 |
| 16 QAM, 2 layers | (16 1) | 16 |
| QPSK, 4 layers | (4 4 2 1) | 32 |
| QPSK, 3 layers | (4 4 1) | 16 |
| QPSK, 2 layers | (4 1) | 4 |

For cases where 2 or 1 reserved node(s) is selected in layers below the top layer, measurement values can be found directly according to regions of the constellation diagram, and traversal of all constellation points is not required. Therefore, for the most complicated case of 64QAM and 4 layers (64, 2, 1, 1), it is only needed to perform independent calculation on a total of 128 paths (each path corresponds to 4 segments of measurements).

The method of ML complementary set path detection will be illustrated below.

After the ML path is determined, complementary set paths corresponding to respective bits in nodes of respective layers are calculated using a number of reserved nodes and extended paths consistent with those of the ML path, and it specifically includes:

finite complete complementary set: a complementary set path of nodes in each layer on the ML is calculated; for a certain layer, it is required firstly to determine nodes for the complementary set in this layer. The embodiment of the disclosure employs a method where a finite complete complementary set is taken by each bit, in a range indicated by selected parameters (the number of iterations, reserved nodes), if it is required to calculate a complementary set of the ith bit of a node of a layer through which the ML path passes, the value of the bit is required to be negated, then a set of nodes obtained by free combination of values of other bits are namely nodes of the complementary set path in the layer. QPSK is taken as an example, it is assumed that a node of the ML path in the layer is '01', complementary set nodes of the layer corresponding to a first bit should be two nodes '10' and '11'; similarly, complementary set nodes corresponding to a second bit are '00' and '10'. It can be seen that the complementary set nodes corresponding to the two bits have already included four constellation points of QPSK, and the node '10' is commonly used by both bits; to avoid duplicated calculation, the concept of the finite complete complementary set is introduced, i.e., constellation points are traversed directly in the layer instead of calculation of a complete complementary set bit by bit;

path extension: for nodes located in layers above a layer where the complementary set is calculated, nodes of a surviving path in path detection can be multiplexed; for nodes below the layer, path extension is performed until a leaf node is reached, using a same node acceptance/rejection principle as that of ML path calculation, according to the $n_s=(n_4, n_3, n_2, n_1)^T$ parameter in table 1. Due to use of the finite complete complementary set, complete paths as many as constellation points (or integral multiple depending on parameters $n_2$ and $n_1$) are finally reserved;

iteration: for $N_s=\Pi_{i=1}^{M_T} n_i$ paths surviving during the calculation of the ML path, paths other than the ML path are sequenced in an ascending order of Euclidean distances (such as a dotted line path in FIG. 4), a reserved path is determined according to the number of iterations. The above finite complete complementary set and path extension are both performed on surviving ML paths, the iteration is namely transfer in sequence of the two steps to other reserved paths other than the ML path for calculation.

Figure 5:
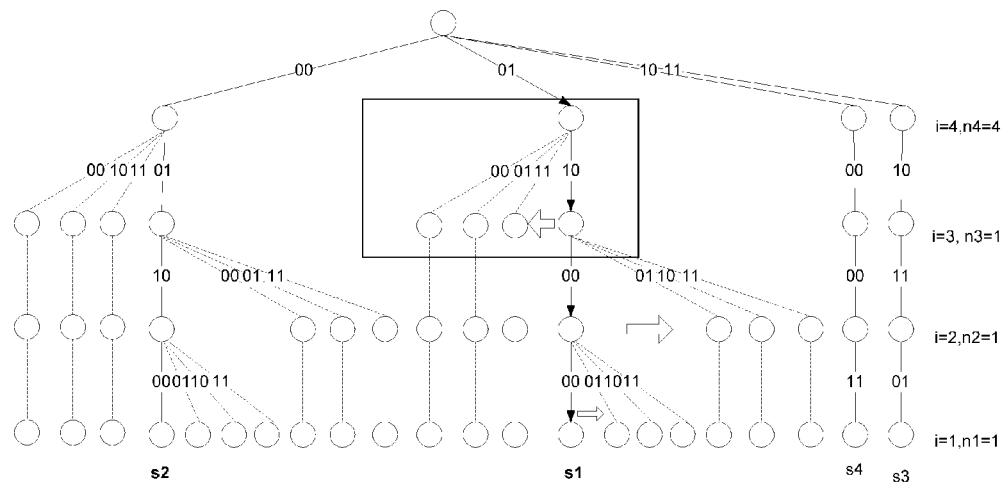
FIG. 5 is a tree diagram showing ML complementary set path detection.

A case of 4*4 MIMO and QPSK is taken as an example, what shown in FIG. 5 is a case where the number of iterations is 1, practical paths are paths reserved during the ML path detection, sequencing according to Euclidean distances gives $\|z-Rs_1\|^2 \leq \|z-Rs_2\|^2 \ldots \leq \|z-Rs_4\|^2$, $s_1$ is namely the ML path.

During the calculation of the ML complementary set path, for the top layer (i=4 in FIG. 5), since it has been traversed during the calculation of the ML path, complementary sets of respective bits are directly selected from solid line paths.

Since a node on the ML path is '01', a complementary set of a first bit is a smaller one of complete paths $s_3$ and $s_4$ where the two nodes '10' and '11' are located, i.e., $s_3$; similarly, a complementary set of a second bit is $s_2$; finally, three values $s_1$, $s_2$ and $s_3$ are combined through the formula 2 as LLR information of the two bit in the layer.

For each layer ($1 \leq i \leq 3$) of three layers below the top layer, a complementary set is calculated according to three steps of finite complete complementary set, path extension and iteration. Assuming that the number of iterations is set to 2. For i=3, firstly $s_1$ path is employed (i.e., a node '01' of the first layer on the $s_1$ path is taken as a parent node) to perform finite complete complementary set node expansion, as shown in the block in FIG. 5. Then path extension is performed downwards on nodes expanded from layer 2 to leaf nodes. For a case as shown in FIG. 5 where the number of iterations is 1, $s_2$ is further used to perform finite complete complementary set node expansion and path extension. Finally, for layer 2, there are 7 candidate complementary set paths (3 curves at branch 2 of $s_1$ layer, 3 curves at branch 2 of $s_2$ layer, and $s_2$ path). Since a node of layer 2 of the ML path (represented by an arrow line) is '10' and complete complementary set nodes corresponding to a first bit are '00' and '01', paths (totally 4) whose nodes of layer 2 are '00' and '01' are selected from the 7 candidate complementary set nodes, and then a smallest Euclidean distance among these paths is selected as the Euclidean distance of the ML complementary set path; the Euclidean distance of the ML complementary set path of a second bit can be calculated similarly. ML complementary set path searching for layer (i=2, 1) can be performed similarly.

The calculation of the ML complementary set path is performed according to parameter $n_s=(n_4, n_3, n_2, n_1)^T$ in table 1, the result of ML path can be multiplexed by the top layer; below are all cases where a reserved node 1 is selected, and measurement values can be found directly according to regions of the constellation diagram, and traversal of all constellation points is not required. Therefore, for the most complicated case of 64QAM, 4 layers and 4 iterations, for i=3 layer, independent calculation of 128 paths (each path corresponds to 3 segments of measurements) is required; for i=2 layer, independent calculation of 128 paths (each path corresponds to 2 segments of measurements) is required; and for i=1 layer, independent calculation of 128 paths (each path corresponds to 1 segment of measurement) is required. And calculation of all layers can be performed independently.

The beneficial effects of the embodiments of the disclosure will be described below through simulation of a receiver of an LTE-A system (Release 10). For specific simulation conditions, refer to 3GPP standards (Release 8), and the main simulation parameters are shown in table 2

TABLE 2

| Parameter | Unit | Value |
| --- | --- | --- |
| Uplink downlink configuration | | 1 |
| Special subframe configuration | | 4 |
| Cyclic prefix | | Normal |
| Cell ID | | 0 |
| Inter-TTI Distance | | 1 |
| Number of HARQ processes | Processes | 7 |
| Maximum number of HARQ transmission | | 4 |
| Redundancy version coding sequence | | For QPSK and 16 QAM {0,1,2,3} For 64 QAM {0,0,1,2} |
| Number of OFDM symbols for PDCCH | OFDM symbols | 2 |

TABLE 2-continued

| Parameter | Unit | Value |
|---|---|---|
| ACK/NACK feedback mode | | Multiplexing |
| Cell-specific reference symbols | | Antenna port 0, 1 |
| UE-specific reference symbols | | Antenna port 7,8, 9,10 |
| Number of allocated resource blocks | Physical Resource Block (PRB) | 50 |
| Modulation and Coding Scheme (MCS) | | 64 QAM, 3/4 code rate; 16 QAM, 1/2 code rate; |
| Propagation Condition | | EPA 5 |
| Correlation Matrix and Antenna Configuration | | 4x4 layer, Low correlation, 1 Code word (CW) corresponds to 2 layers |

Figure 6:
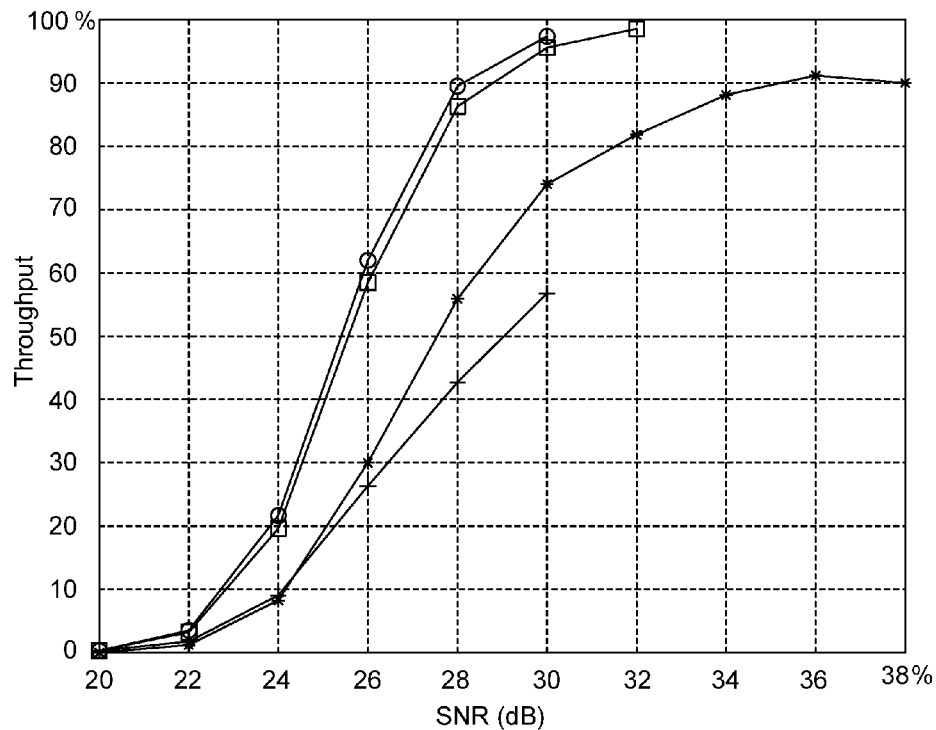
FIG. 6 is a comparison diagram of throughput simulation results between prior arts 1, 2, 3 and 64QAM according to an embodiment of the disclosure.

FIG. 6 is a comparison diagram of throughput simulation results between prior arts 1, 2, 3 and 64QAM according to an embodiment of the disclosure; and FIG. 7 is a comparison diagram of throughput simulation results between prior arts 1, 2, 3 and 16QAM according to an embodiment of the disclosure. In FIGS. 6 and 7, curves with crossings represent throughput performance of prior arts 1 and 2, curves with small circles represent throughput performance of prior art 3, curves with squares represent throughput performance of the embodiments of the disclosure, and curves with stars represent a lower limit (Minimum Mean Square Error, MMSE) of throughput performance. When a trim level parameter Lmax>0.2, it can be considered that the performance approaches the ML performance, the curve of prior art 3 in FIG. 6 is obtained when Lmax=0.5, and the curve of prior art 3 in FIG. 7 is obtained when Lmax=1.

With reference to FIG. 6, the curve with crossings is below the curve with stars, in cases of same throughput, prior arts 1 and 2 have high SNRs, it indicates that the throughput performance of prior arts 1 and 2 do not reach the lower limit of the throughput performance, that is to say, the performance is poor and can not reach the ML performance.

With reference to FIGS. 6 and 7, the curves with small circles are above the curves with squares, in cases of same throughput, the SNR of the embodiment of the disclosure is slightly higher than that of the prior art 3; in FIG. 6 when the throughput is 70%, the difference between the SNR of the embodiment of the disclosure and the SNR of prior art 3 is less than 0.3 dB; in FIG. 7 when the throughput is 70%, the difference between the SNR of the embodiment of the disclosure and the SNR of prior art 3 is less than 0.2 dB, it can be seen that the performance of the embodiment of the disclosure approaches the ML performance.

However, the complexity of the embodiment of the disclosure is far less than that of prior art 3. Table 3 is a statistics table showing the complexity of the embodiment of the disclosure (64 QAM 2, 3, 4 layers; 16QAM 2, 3, 4 layers), Table 4 is a statistics table showing the complexity of prior art 3 (16QAM, 4 layers), and FIG. 5 is a statistics table showing the complexity of prior art 3 (64QAM, 4 layers) when the SNR is 30 dB. It can be seen from Table 3 that the embodiment of the disclosure has a fixed complexity, it can be seen from Table 4 that the complexity of prior art 3 varies depending on the SNR, and it can be seen from Table 5 that the prior art 3 has very high complexity when the SNR is high.

With reference to Tables 3 and 4, for 16QAM and 4 layers for example, the embodiment of the disclosure has 12794 additions and 84 multiplications, while for prior art 3, the average value of the number of additions is 22461 when Lmax=1 and the number of multiplications is 14757 when Lmax=1; with reference to Tables 3 and 5, for 64QAM and 4 layers, the embodiment of the disclosure has 60370 additions and 124 multiplications, while prior art 3 has 292130 additions and 40459 multiplications when Lmax=0.5 and SNR=30 dB. It can be seen from above comparison that both the number of additions and the number of multiplications of the embodiment of the disclosure are far less than that of prior art 3 respectively, and the decrease in the number of multiplications is particularly apparent, thus indicating that the complexity of the embodiment of the disclosure is greatly reduced with respect to prior art 3

TABLE 3

| | 64QAM, 4 layers | 64QAM, 3 layers | 64QAM, 2 layers | 16QAM, 4 layers | 16QAM, 3 layers | 16QAM, 2 layers |
|---|---|---|---|---|---|---|
| Addition | 60370 | 27833 | 4472 | 12794 | 5952 | 1032 |
| Multiplication | 124 | 75 | 42 | 84 | 51 | 20 |

TABLE 4

| | Addition | | | | | Multiplication | | | | |
|---|---|---|---|---|---|---|---|---|---|---|
| Signal Noise Ratio | Lmax = 0 | Lmax = 0.2 | Lmax = 0.5 | Lmax = 1 | Lmax = 1e10 | Lmax = 0 | Lmax = 0.2 | Lmax = 0.5 | Lmax = 1 | Lmax = 1e10 |
| 0 | 18645 | 22229 | 28377 | 38129 | 58013 | 12085 | 14379 | 18314 | 24547 | 37230 |
| 2 | 14475 | 17940 | 23719 | 32292 | 46085 | 9587 | 11745 | 15450 | 20934 | 29737 |
| 4 | 12481 | 15629 | 20936 | 28094 | 37071 | 8307 | 10330 | 13736 | 18317 | 24048 |
| 6 | 11015 | 13800 | 18427 | 24236 | 30419 | 7411 | 9204 | 12177 | 15898 | 19846 |
| 8 | 10427 | 12866 | 16818 | 21407 | 25715 | 7062 | 8635 | 11176 | 14117 | 16868 |
| 10 | 10300 | 12533 | 16036 | 19759 | 22744 | 6997 | 8438 | 10693 | 13079 | 14986 |
| 12 | 10533 | 12506 | 15490 | 18474 | 20821 | 7154 | 8428 | 10348 | 12259 | 13759 |
| 14 | 11073 | 12576 | 14801 | 16851 | 18297 | 7513 | 8484 | 9918 | 11231 | 12155 |
| 16 | 12139 | 13342 | 14971 | 16369 | 17314 | 8200 | 8977 | 10025 | 10920 | 11524 |
| 18 | 13256 | 14034 | 15049 | 15903 | 16478 | 8922 | 9424 | 10076 | 10623 | 10990 |
| 20 | 14083 | 14542 | 15097 | 15566 | 15899 | 9454 | 9751 | 10107 | 10407 | 10620 |
| Average value | 12584 | 14727 | 18156 | 22461 | 28077 | 8426 | 9799 | 12001 | 14757 | 18342 |

TABLE 5

| | Addition | Multiplication |
|---|---|---|
| Signal Noise Ratio (SNR) (dB) | Lmax = 0.5 | Lmax = 0.5 |
| 30 | 292130 | 40459 |

The embodiment of the disclosure applies to both a terminal receiver and a base station receiver. By means of the embodiments of the disclosure, the MIMO detection can acquire a performance approaching ML and its complexity is reduced greatly, thereby making the MIMO detection achievable. The iterative processing adopted in the embodiments of the disclosure has no feedback mechanism and thus can be implemented in parallel, and a unified processing unit and parameters are used by respective branches, thus the embodiments of the disclosure enable a short processing delay and a small cache, and they are suitable for a parallel pipeline structure and have more advantages in implementation of terminal receivers.

What described are merely preferable embodiments of the disclosure, and are not intended to limit the disclosure.

The invention claimed is:

1. A method for Soft-output Fixed-complexity Sphere Decoding (SFSD) detection, comprising:
    performing QR decomposition on a channel response matrix to acquire a Q matrix and an R matrix;
    multiplying a conjugate transpose of the Q matrix by a received signal to acquire an equalized signal of the received signal;
    performing path extension starting from a top layer of the R matrix, which is a layer having only one non-zero element, to a bottom layer of the R matrix;
    reserving all nodes of the top layer of the R matrix;
    decreasing, layer by layer, reserved nodes in layers below the top layer of the R matrix to acquire Euclidean distances of respective branches;
    selecting a branch having a minimum Euclidean distance as a Maximum Likelihood (ML) path, and reserving branches as many as iterations;
    performing path extension starting from a top layer of acquired complementary set layers of respective reserved branches to corresponding bottom layer of the acquired complementary set layers;
    reserving all nodes of the top layer of the acquired complementary set layers;
    decreasing, layer by layer, reserved nodes in layers below the top layer of the acquired complementary set layers to acquire Euclidean distances of respective branches;
    selecting, layer by layer, starting from the top layer of the acquired complementary set layers, a branch having a minimum Euclidean distance as an ML complementary set path of each layer; and
    acquiring Likelihood Ratio (LLR) information of each bit of each symbol of each layer according to the ML path and the ML complementary set path.

2. The method according to claim 1, wherein the decreasing, layer by layer, reserved nodes in layers below the top layer of the acquired complementary set layer comprises:
    decreasing, layer by layer, reserved nodes in layers below the top layer of the acquired complementary set layer until the bottom layer of the acquired complementary set layers has one node.

3. An apparatus for Soft-output Fixed-complexity Sphere Decoding (SFSD) detection, comprises a processor configured to be capable of executing programmed instructions comprising:
    performing QR decomposition on a channel response matrix to acquire a Q matrix and an R matrix;
    multiplying a conjugate transpose of the Q matrix by a received signal to acquire an equalized signal of the received signal;
    performing path extension starting from a top layer of the R matrix, which is a layer having only one non-zero element, to a bottom layer;
    reserving all nodes of the top layer of the R matrix;
    decreasing, layer by layer, reserved nodes in layers below the top layer of the R matrix to acquire Euclidean distances of respective branches;
    selecting a branch having a minimum Euclidean distance as a Maximum Likelihood (ML) path, and reserving branches as many as iterations;
    performing path extension starting from a top layer of acquired complementary set layers of respective reserved branches to corresponding bottom layer of the acquired complementary set layers;
    reserving all nodes of the top layer of the acquired complementary set layers;
    decreasing, layer by layer, reserved nodes in layers below the top layer of the acquired complementary set layers to acquire Euclidean distances of respective branches;
    selecting, layer by layer, starting from the top layer of the acquired complementary set layers, a branch having a minimum Euclidean distance as an ML complementary set path of each layer; and
    acquiring Likelihood Ratio (LLR) information of each bit of each symbol of each layer according to the ML path and the ML complementary set path.

4. The apparatus according to claim 3, wherein the decreasing, layer by layer, reserved nodes in layers below the top layer of the acquired complementary set layer comprises:
    decreasing, layer by layer, reserved nodes in layers below the top layer of the acquired complementary set layers until the corresponding bottom layer of the acquired complementary set layers has one node.

* * * * *